US007577883B2

United States Patent
Pei et al.

(10) Patent No.: US 7,577,883 B2
(45) Date of Patent: Aug. 18, 2009

(54) DATA TRANSMISSION SPEED TEST SYSTEM AND METHOD

(75) Inventors: Hua-Wei Pei, Shenzhen (CN); Zheng-Quan Peng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 212 days.

(21) Appl. No.: 11/778,073

(22) Filed: Jul. 16, 2007

(65) Prior Publication Data

US 2008/0059848 A1  Mar. 6, 2008

(30) Foreign Application Priority Data

Sep. 1, 2006 (CN) .......................... 2006 1 0062446

(51) Int. Cl.
*G01R 31/28* (2006.01)
*G06F 7/00* (2006.01)

(52) U.S. Cl. .......................................... 714/712; 707/1
(58) Field of Classification Search ................... None
See application file for complete search history.

(56) References Cited

U.S. PATENT DOCUMENTS

| 5,920,865 | A  | * | 7/1999 | Ariga ........................... 707/10 |
| 6,034,782 | A  |   | 3/2000 | Hines |
| 6,567,515 | B1 | * | 5/2003 | Hosein ........................ 379/230 |
| 6,888,796 | B2 | * | 5/2005 | Iizuka ......................... 370/232 |
| 6,925,057 | B2 | * | 8/2005 | Cheng et al. ................. 370/235 |

* cited by examiner

*Primary Examiner*—Christine T Tu
(74) *Attorney, Agent, or Firm*—Frank R. Niranjan

(57) ABSTRACT

A data transmission speed test system is provided. The system includes a computer. The computer is configured for reading data stored in a database and transmitting the data to a target device. The computer is further configured for testing data transmission speeds at regular time intervals and dynamically displaying the data transmission speeds, such as a maximal speed, a minimal speed and an average speed at different time on a display device, during the whole data transmission process. A related method is also provided.

4 Claims, 2 Drawing Sheets

DATA TRANSMISSION SPEED TEST SYSTEM AND METHOD

BACKGROUND OF THE INVENTION

1. Field of the Invention

The present invention relates to computer device test systems and methods, and especially to a data transmission speed test system and method.

2. Description of Related Art

With the development of computer technology, all kinds of peripheral devices occur. In computer hardware, a peripheral device is any device attached to a computer in order to expand the computer's functionality. Some of the more common peripheral devices are printers, scanners, disk drives, tape drives, microphones, speakers, cameras, mobile phones and all kinds of hard disks. A peripheral device may be connected to the computer directly or via a data bus to transmit data between the computer and the peripheral device.

Transmission speeds of the data may differ due to different peripheral devices. A traditional method to test the transmission speeds of data is done by recording the total time used for transmitting the data from the computer to a peripheral device (i.e. a mobile phone) with a stopwatch and computing an average transmission speed dependent on the total data size and the total time. Due to that a stopwatch is only accurate to the seconds and that it's very difficult to record an accurate and precise beginning time and ending time of data transmission via stopwatch, it's obvious that the above method may bring great error. Moreover, the above method can only obtain the average transmission speed at the end of data transmission, but if transmission speed changes, users will not know the detailed speed values during transmission.

What is needed, therefore, is a data transmission speed test system and method with high precision, moreover, the system and method are able to record detailed speed change process.

SUMMARY OF THE INVENTION

A data transmission speed test system according to a preferred embodiment is provided. The system includes a computer. The computer includes: a data reading module programmed for reading the data to be transmitted from a database; a destination path setting module programmed for setting a destination path to receive the data; a time interval setting module programmed for setting a time interval to test transmission speeds of the data; a timing module programmed for timing when the transmission begins; a determining module programmed for determining whether the current time equals an integer multiple of the time interval; a computing module for computing an average speed in the current time interval, obtaining a maximal speed and a minimal speed from average speeds in all past time intervals, and computing an average speed from the beginning time to the current time, if the current time equals an integer multiple of the time interval; and a displaying module programmed for displaying the maximal speed, the minimal speed and the average speed from the beginning time to each integer multiple of the time interval on a display device.

Another embodiment provides a preferred method for data transmission speed test. The method includes the steps of: (a) reading data to be transmitted from a database; (b) setting a destination path to receive the data; (c) setting a time interval to test transmission speeds of the data; (d) timing the data transmission when the data transmission begins; (e) determining whether the current time equals an integer multiple of the time interval; (f) computing an average speed in the current time interval, obtaining a maximal speed and a minimal speed from average speeds in all past time intervals, and computing an average speed from the beginning time to the current time, if the current time equals an integer multiple of the time interval; (g) displaying the maximal speed, the minimal speed and the average speed from the beginning time to the current time on a display device; (h) determining whether all the data has been transmitted to the destination path; and (i) returning to the first determining step, if not all the data has been transmitted to the destination path.

Other objects, advantages and novel features of the present invention will be drawn from the following detailed description of the preferred embodiment and preferred method of the present invention with the attached drawings.

DETAILED DESCRIPTION OF THE PREFERRED EMBODIMENT

Figure 1:
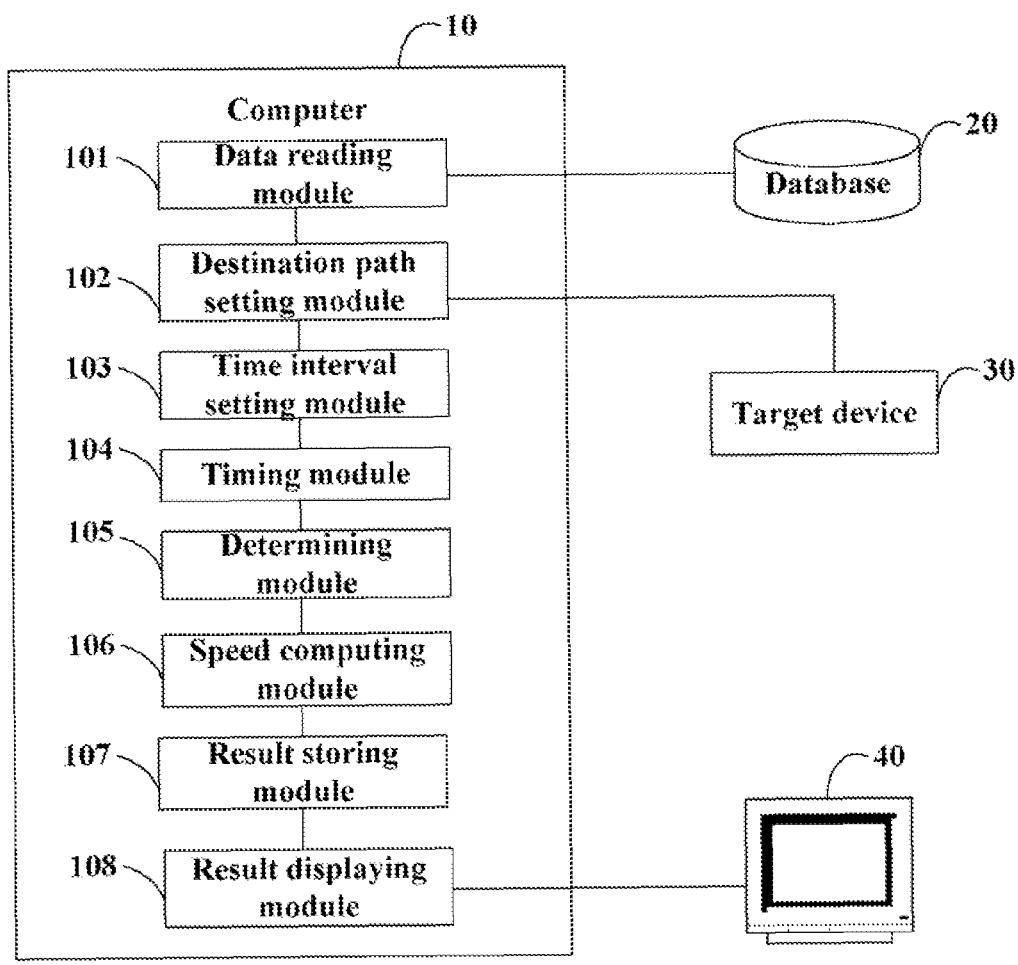
FIG. 1 a schematic diagram of a data transmission speed test system according to a preferred embodiment.

FIG. 1 a schematic diagram of a data transmission speed test system according to a preferred embodiment. The system typically includes a computer 10 and a database 20 connected to the computer 10. The computer 10 is configured for reading data stored in the database 20 and transmitting the data to a target device 30. The data to be transmitted can be document files, executive programs, installation programs, system files or any other kind of files that can be transmitted from the computer 10. The database 10 may be a storage device (i.e. a read only memory) in the computer 10. The target device 30 may be a storage device (i.e. a hard disk) in the computer 10 or a peripheral device directly connected to the computer 10, such as a media player 3 (MP3) or any digital data storage device connected to the computer 10 via a network, such as a local area network (LAN), a wide area network (WAN), a metropolis area network (MAN), or any other kind of network. The computer 10 is further configured for testing data transmission speeds at regular time intervals and dynamically displaying the data transmission speeds, such as a maximal speed, a minimal speed, and an average speed at different time on a display device 40, during the whole data transmission process.

The computer 10 includes a plurality of modules, mainly: a data reading module 101, a destination path setting module 102, a time interval setting module 103, a timing module 104, a determining module 105, a speed computing module 106, a result storing module 107 and a result displaying module 108.

The data reading module 101 is programmed for reading data to be transmitted from the database 20.

The destination path setting module 102 is programmed for setting a destination path in the target device 30 to receive the data.

The time interval setting module 103 is programmed for setting a time interval (i.e. 2 seconds) to test transmission speeds of the data based on users' requirements. The time interval can be accurate to 0.001 second or to a much smaller time measuring unit.

The timing module 104 is programmed for timing the data transmission from a beginning time (i.e. T=0). Accordingly, the timing module 104 can be accurate to 0.001 second or to a much smaller time measuring unit.

The determining module 105 is programmed for determining whether the current time equals an integer multiple of the time interval. Supposing the time interval is 2 seconds, the determining module 105 determines whether the current time equals 2 s, 4 s, 6 s or any other integer multiple of 2 seconds.

The speed computing module 106 is programmed for computing an average speed in the current time interval, obtaining a maximal speed and a minimal speed from average speeds in all past time intervals, and computing an average speed from the beginning time to the current time, if the current time equals an integer multiple of the time interval. Supposing the time interval is 2 seconds, if the current time T=2 s, the size of data that has been transmitted in the first time interval [0,2] is A bytes, the speed computing module 106 computes that an average transmission speed in the first time interval [0,2] equals A/2 bytes (recorded as V1). V1 is also regarded as the maximal speed, the minimal speed and the average speed from the beginning time to the current time T=2 s. If the current time T=4 s, the size of data that has been transmitted in the second time interval [2,4] is B bytes, the speed computing module 106 computes that an average transmission speed in the second time interval [2,4] equals B/2 bytes (recorded as V2) and an average speed from T=0 to T=4 equals (A+B)/4 bytes. Then, the speed computing module 106 compares V1 and V2 to obtain the maximal speed and the minimal speed from t=0 to T=4 s.

The result storing module 107 is programmed for storing the computation results, such as the maximal speed, the minimal speed and the average speed from the beginning time to each integer multiple of the time interval, as a file in the database 20.

The result displaying module 108 is programmed for displaying the computation results, such as the maximal speed, the minimal speed and the average speed from the beginning time to the current time on the display device 40.

Figure 2:
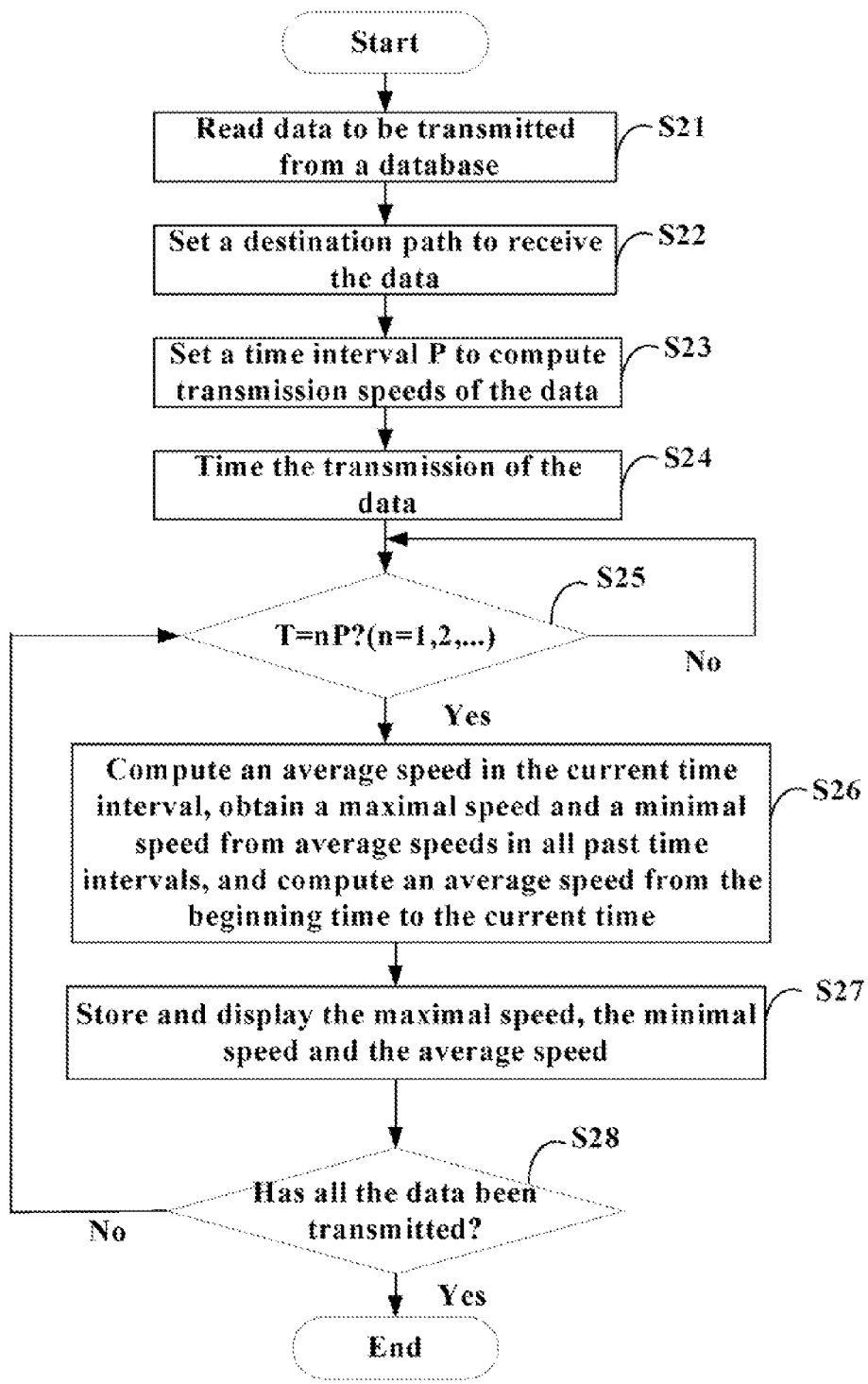
FIG. 2 is a flowchart of a preferred method for data transmission speed test.

FIG. 2 is a flowchart of a preferred method for data transmission speed test. In step S21, the data reading module 101 reads data to be transmitted from the database 20, such as E:\VC_install.rar. In step S22, the destination path setting module 102 sets a destination path to receive the data in the destination device 30, such as C:\. In step S23, the time interval setting module 103 sets a time interval P (i.e. P=2 s).

In step S24, the timing module 104 starts to time at the beginning of data transmission, such as from T=0. In step S25, the determining module 105 determines whether the current time equals an integer multiple of the time interval, for example whether T=nP(s) (n is a natural number). If the current time T does not equal an integer multiple of the time interval P, the timing module 104 goes on timing and the determining module 105 goes on determining.

In step S25, if the current time T equals an integer multiple of the time interval P, in step S26, the speed computing module 106 computes an average speed in the current time interval, obtaining a maximal speed and a minimal speed from average speeds in all past time intervals, and computing an average speed from the transmission beginning time to the current time. Supposing the time interval is 2 seconds, if the current time T=2 s, the size of data that has been transmitted in the first time interval [0,2] is A bytes, the speed computing module 106 computes that an average transmission speed in the first time interval [0,2] equals A/2 bytes (recorded as V1). V1 is also regarded as the maximal speed, the minimal speed and the average speed from the beginning time to the current time T=2 s. If the current time T=4 s, the size of data that has been transmitted in the second time interval [2,4] is B bytes, the speed computing module 106 computes that an average transmission speed in the second time interval [2,4] equals B/2 bytes (recorded as V2), and an average speed from T=0 to T=4 equals (A+B)/4 bytes. Then, the speed computing module 106 compares V1 and V2 to obtain the maximal speed and the minimal speed from t=0 to T=4 s.

As soon as the data transmission speeds have been computed, in step S27, the result displaying module 108 displays the computation results, such as the maximal speed, the minimal speed and the average speed on the display device 40, the result storing module 107 stores the computation results as a record in a file stored in the database 20.

During the speed computation, result displaying and storing process, the timing module 104 goes on timing, then in step S28, the determining module 105 determines whether all the data have been transmitted to the target location. If all the data have been transmitted to the target location, the procedure ends; otherwise, if transmission of all the data has not finished, the procedure goes to step S25 to start up a new computation, displaying and storing process.

Although the present invention has been specifically described on the basis of a preferred embodiment and preferred method, the invention is not to be construed as being limited thereto. Various changes or modifications may be made to the embodiment and method without departing from the scope and spirit of the invention.

What is claimed is:

1. A data transmission speed test system comprising a computer, the computer comprising:
    a data reading module programmed for reading data to be transmitted from a database;
    a destination path setting module programmed for setting a destination path to receive the data;
    a time interval setting module programmed for setting a time interval to test transmission speeds of the data;
    a timing module programmed for timing the data transmission when the data transmission begins;
    a determining module programmed for determining whether the current time equals an integer multiple of the time interval;
    a computing module programmed for computing an average speed in the current time interval, obtaining a maximal speed and a minimal speed from average speeds in all past time intervals, and computing an average speed from the beginning time to the current time, if the current time equals an integer multiple of the time interval; and
    a result displaying module programmed for displaying on a display device the maximal speed, the minimal speed and the average speed from the beginning time to each integer multiple of the time interval.

2. The system as claimed in claim 1, wherein the computer further comprises a result storing module programmed for storing the maximal speed and the minimal speed and the average speed from the beginning time to each integer multiple of the time interval in the database.

3. A computer-based data transmission speed test method, comprising:
    reading data to be transmitted from a database;
    setting a destination path to receive the data;
    setting a time interval to test transmission speeds of the data;
    timing the data transmission when the data transmission begins;
    determining whether the current time equals an integer multiple of the time interval;
    computing an average speed in the current time interval, obtaining a maximal speed and a minimal speed from average speeds in all past time intervals, and computing an average speed from the beginning time to the current time, if the current time equals an integer multiple of the time interval;

displaying the maximal speed, the minimal speed, and the average speed from the beginning time to the current time on a display device;

determining whether all the data has been transmitted to the destination path; and returning to the first determining step, if not all the data has been transmitted to the destination path.

4. The method as claimed in claim 3, further comprising:

storing the maximal speed and the minimal speed and the average speed from the beginning time to each integer multiple of the time interval as a file in the database.

* * * * *